(12) United States Patent
Fairchild et al.

(10) Patent No.: US 6,728,760 B1
(45) Date of Patent: Apr. 27, 2004

(54) OPTIMIZING DELIVERY OF COMPUTER MEDIA

(75) Inventors: Kim Michael Fairchild, Cambridge, MN (US); Looi Chee Kit, Singapore (SG); Wong Lung Hsiang, Singapore (SG); Foong Hock Kuen, Singapore (SG); Olivo Miotto, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/305,574

(22) Filed: May 5, 1999

(51) Int. Cl.[7] .............................................. G06F 15/16
(52) U.S. Cl. ........................ 709/217; 709/201; 707/203
(58) Field of Search ................................ 709/217, 202, 709/201; 725/46; 713/155, 201; 707/203

(56) References Cited

U.S. PATENT DOCUMENTS

| | | | | |
|---|---|---|---|---|
| 5,675,802 A | * | 10/1997 | Allen et al. ................. | 707/203 |
| 5,734,720 A | * | 3/1998 | Salganicoff ................. | 380/211 |
| 5,740,231 A | * | 4/1998 | Cohn et al. ................. | 370/401 |
| 5,822,537 A | * | 10/1998 | Katseff et al. .............. | 370/231 |
| 5,944,780 A | * | 8/1999 | Chase et al. ................ | 709/201 |
| 6,088,722 A | * | 7/2000 | Herz et al. .................. | 709/217 |
| 6,363,140 B1 | * | 3/2002 | Pinard ....................... | 379/88.22 |

* cited by examiner

*Primary Examiner*—Majid Banankhah
(74) *Attorney, Agent, or Firm*—Fulbright & Jaworski L.L.P.

(57) ABSTRACT

A method of optimizing delivery of computer media over a network of computers involves creating an annotation record for each item of computer media. Within the annotation record at least some of the following classes of information are included: (i) an identification of the computer on which the media item was created or introduced to the network; (ii) identifications of one or more computers on which a copy of the media item is presently located; (iii) an identification list of computers which have established a computer link to the media item; (iv) an identification list of computer users who have personal software assistants which have established a computer link to the media item; (v) an indication enabling version control of the media item; and (iv) one or more indications as to the subject matter of the media item. Whenever a media item is updated or deleted, the corresponding annotation record is also updated and a notification record is forwarded to each computer or a personal software assistant of each computer user on the network which has a computer link to the media item.

13 Claims, 8 Drawing Sheets

User A's PA

User B's PA

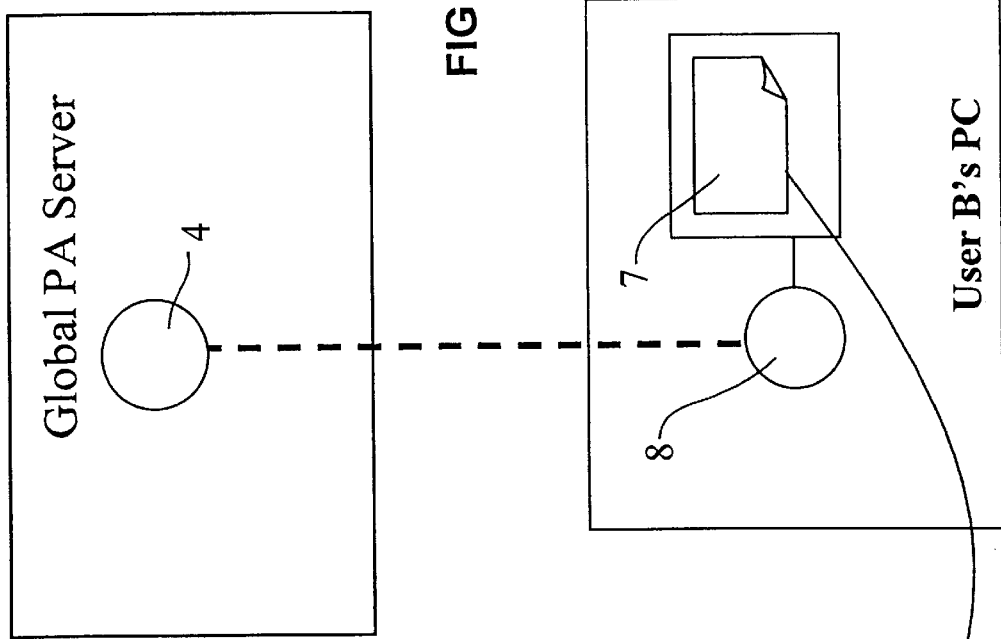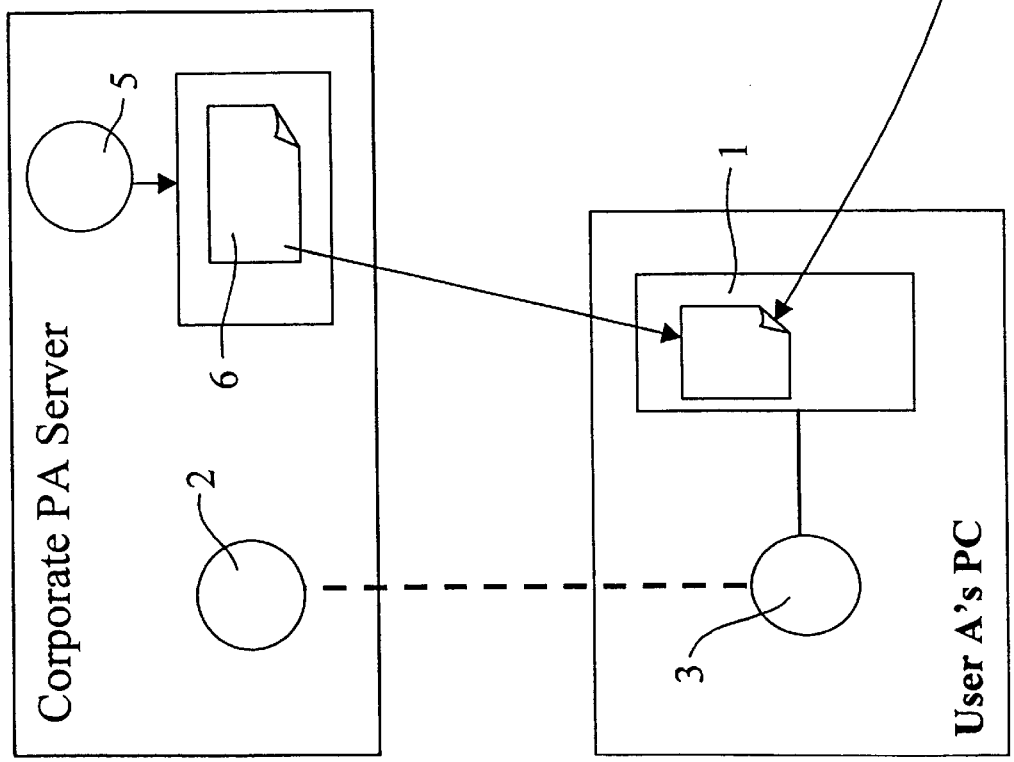
FIG 1

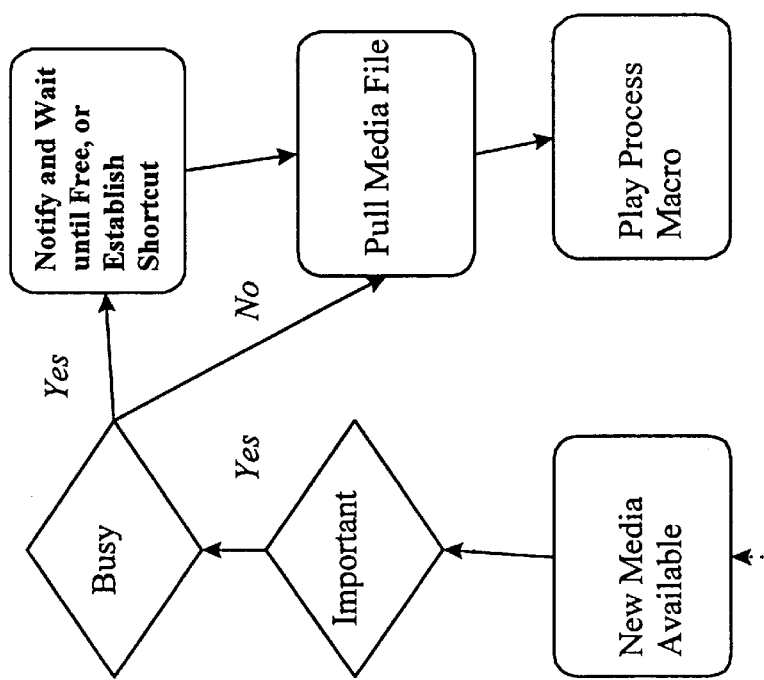
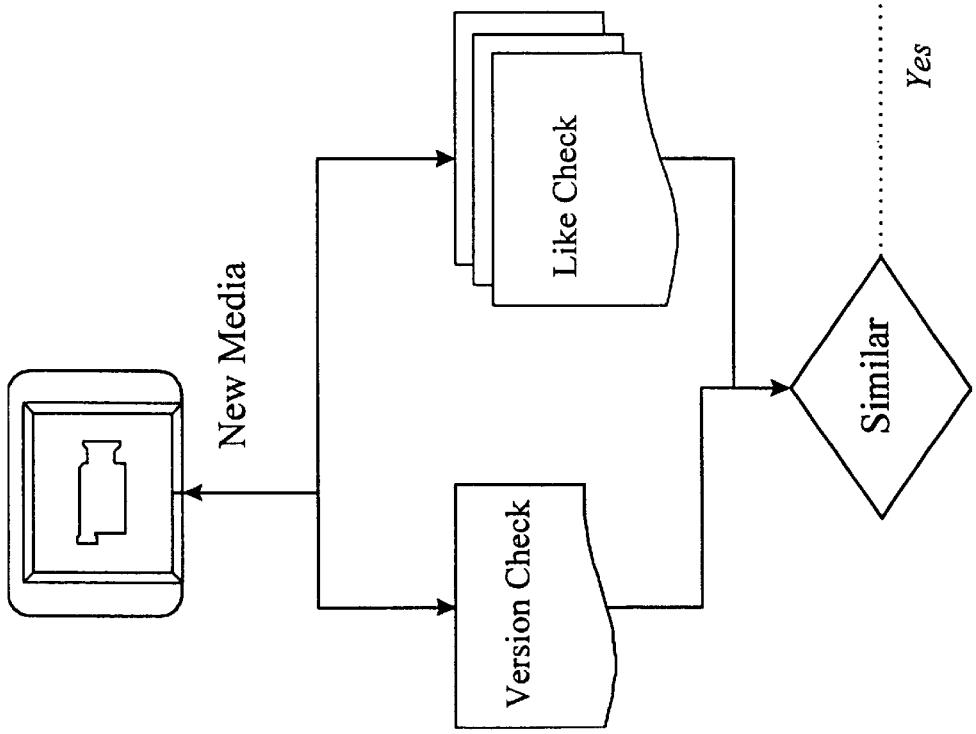
FIG 8

OPTIMIZING DELIVERY OF COMPUTER MEDIA

This invention relates to optimisation of the delivery of computer media over a network of computers. It relates particularly but not exclusively to a method of optimising delivery of computer media and a system for efficient delivery of media over a computer network, using software agents known as personal software assistants and associated user preferences files and media data files.

There are often problems associated with developing and maintaining a spontaneous online community on a network such as the Internet. Each user may want to share with other users certain files such as documents, databases, sound files, movies, images, and spreadsheets. For the sake of convenience, all such files are hereinafter referred to as "computer media" or "media items". However, it is often difficult to determine which other users will want to receive particular media items, and it is often difficult to ascertain whether a particular media item is the latest available version.

For example, in the case of a person who has recently become a father for the first time, he may want to collect and share media items relating to his child such as images, stories, announcements, voice recordings and video. He has a wide circle of friends with whom he would like to share these media items. He could attempt to include the files as attachments in e-mail messages; however he would quickly discover that the people to whom he was sending the media items would be annoyed to be spending significant time downloading large binary files when they had simply popped online to check their e-mail. Moreover, mail routers have non-consistent limits to the size of e-mail messages, and in any event it would be difficult to keep track of who has which media items already, which media items they were interested in, or even which media items they had the capability of viewing or processing.

In any group work such as a project team in a corporation or enterprise, documents which are shared typically develop over several versions. The originator of a project plan, for example, will refine the plan into newer versions. If appropriate version control software is being used, the members of the project group are notified as soon as the new versions are created. This type of new version notification would be helpful in the scenario described above.

Typically in most groupware systems, all shared documents are stored on a server. The server may create a bottleneck on the network when the users make too many concurrent accesses to the documents. It would be helpful to allow organisations to strike a balance between their need to protect their server resources and their users' desire to be free to associate and share information. It would be helpful if, when a user wishes to share a document that resides on his or her PC, he or she could do so without moving it to the server, lessening the demand for server disk space.

It would also be helpful in the scenario described above for the user, upon receiving a media item of a type which he or she finds useful or desirable, to be able to specify a desire for receiving or being notified of similar types of media item in the future.

U.S. Pat. No. 5,799,318 describes a method and apparatus for collecting and displaying information from diverse computer resources. For each piece of information an item is created describing the information and referring to an attached file. Each item is grouped into a selected view for a particular user. Changes or additions in information are determined and indicated with respect to each user. This enables the creation of some sort of order out of the chaos of a number of unrelated or loosely related information files, and solves the version control problem, but results only in the cataloguing of information, not in the pro-active discovery of relevant information or the optimisation of the delivery of media items.

U.S. Pat. No. 5,655,081 described a system for monitoring and managing computer resources and applications across a distributed computing environment using an intelligent autonomous agent architecture. A manager software system runs on a networked computer system designated as a network management computer system or a "console" system. An agent software system runs on each of the server computer systems in the network to be monitored. Each respective agent software system carries out tasks on the computer system on which it is installed such as discovering which resources and applications are present on the computer system, monitoring particular aspects of the resources and applications present on the computer system, and executing recovery actions automatically when such actions are warranted. The agents are capable of intelligent autonomous operation. The system described includes several useful features; however, it is not directed towards solving the problems described in the scenario above. In particular, it is not directed towards the optimisation of the delivery of computer media.

According to a first aspect of the present invention there is provided a method of optimising delivery of computer media over a network of computers, including the steps of:
  (a) creating an annotation record for each item of computer media;
  (b) including within the annotation record at least some of the following classes of information:
     (i) an identification of the computer on which the media item was created or introduced to the network
     (ii) identifications of one or more computers on which a copy of the media item is presently located
     (iii) an identification list of computers which have established a computer link to the media item
     (iv) an identification list of computer users who have personal software assistants which have established a computer link to the media item
     (v) an indication enabling version control of the media item
     (vi) one or more indications as to the subject matter of the media item; and
  (c) whenever a media item is updated or deleted, updating the corresponding annotation record and forwarding a notification record to each computer or a personal software assistant of each computer user on the network which has a computer link to the media item.

The updating or deletion notification may be forwarded to other computers in any suitable manner. It may be forwarded in the form of e-mail; alternatively, each computer user may have an associated data record which maintains details of the media to which the user has computer links, and the updating or deletion notification may be posted directly to the user's data record. The user's data record may also include information concerning the user's media item preferences.

The method described above may include the further steps of:
  (a) creating one or more preferences records for one or more computers or computer users on the network;
  (b) including within the preferences records indications as to preferred subject matter of media items, based on one or more of the following:

(i) preferences expressly indicated by the computer user
(ii) preferences ascertained from the subject matter of media items to which the computer or computer user has previously established computer links
(iii) preferences ascertained from the subject matter of media searches conducted on the computer or by the computer user; and (c) providing each computer or computer user with access to a new or modified media item whenever that media item relates to a subject matter which is included in the computer's or computer user's preferences record. The step of providing access to a new or modified media item may be accomplished by any suitable means. In one preferred arrangement, the step is done by means of a search for new or modified media of relevant subject matter which is conducted whenever the computer or computer user comes on-line or in some other periodical manner, followed by establishing a computer link to the media items located in the search. In an alternative arrangement, the step of providing access to a new or modified media item is done whenever a media item is created or modified, by means of a search for preferences records which indicate a preference for subject matter corresponding to the subject matter of the new or modified media item, followed by the step of forwarding a notification record to the computer or computer user associated with each preferences record located in the search.

The network of computers may include one or more intermediate computers which may include personal software assistant servers located in the network between other computers such that at least some of the media items travel from an originating computer through an intermediate computer to a requesting computer. In such a case, one or more media items may be cached in one or more of the intermediate computers, and a request from a requesting computer for a media item may be satisfied from a cached copy on an intermediate computer in preference to establishing a communications path all the way to the originating computer, thereby reducing the total amount of traffic necessary on the network, particularly when the media item is requested frequently.

When a particular request for a media item cannot be satisfied by a particular computer as a result of the computer being off-line or the media item having been deleted from that computer, the request can be passed to another computer in the network having a copy of the media item.

New or updated media items may be downloaded to one or more computers which have links to those media items at any suitable times. Particularly suitable times include:
(i) during off-peak times for traffic on the network;
(ii) when specifically requested by those computers; or
(iii) at times previously designated by those computers.

According to a second aspect of the invention, there is provided a method of selectively providing computer media to a computer user on a computer connected to a network, including the steps of:
(a) creating a preferences record for the computer user;
(b) including within the preferences records indications as to preferred subject matter of media items, based on one or more of the following:
(i) preferences expressly indicated by the computer user
(ii) preferences ascertained from the subject matter of media items to which the computer user has previously established computer links
(iii) preferences ascertained from the subject matter of media searches conducted by the computer user; and
(c) providing the computer user with access to a new or modified media item whenever that media item relates to a subject matter which is included in the computer user's preferences record.

The step of providing access to a new or modified media item may be accomplished in any suitable manner. In one preferred arrangement, this is done by means of a search for new or modified media items of relevant subject matter which is conducted whenever the computer or computer user comes on-line or in some other periodical manner, followed by establishing a computer link to the media items located in the search. In an alternative arrangement, the step of providing access to a new or modified media item is done whenever a media item is created or modified, by means of a search for preferences records which indicate a preference for subject matter corresponding to the subject matter of the new or modified media item, followed by the step of forwarding a notification record to the computer or computer user associated with each preferences record located in the search.

According to a third aspect of the invention there is provided a system for efficient delivery of computer media over a network of computers, including:
(a) one or more software agents associated with one or more computers on the network;
(b) one or more preferences records associated with each software agent, each preferences record including indications as to preferred subject matter of media items for a computer user, based on one or more of the following:
(iii) preferences expressly indicated by the computer user
(iv) preferences ascertained from the subject matter of media items to which the computer user has previously established computer links
(v) preferences ascertained from the subject matter of media searches conducted by the computer user;
(c) a plurality of computer media items located on computers on the network, each media item have associated with it one or more indications of subject matter;
wherein a software agent provides a computer user with access to a new or modified media item whenever that media item relates to a subject matter which is included in the computer user's preferences record.

According to a fourth aspect of the invention, there is provided a system for efficient delivery of computer media over a network of computers, including:
(a) a plurality of computer media items located on computers on the network;
(b) an annotation record for each media item on a computer, each annotation record including at least some of the following classes of information:
(i) an identification of the computer on which the media item was created or introduced to the network
(ii) identifications of one or more computers on which a copy of the media item is presently located
(iii) an identification list of computers which have established a computer link to the media item
(iv) an identification list of computer users who have personal software assistants which have established a computer link to the media item
(v) an indication enabling version control of the media item
(vi) one or more indications as to the subject matter of the media item; and (c) a software agent associated with each computer which has annotation records;

wherein, whenever a media item is updated or deleted, the software agent associated with the corresponding annotation record updates the annotation record and forwards a notification record to each computer or a personal software assistant of each computer user on the network which has a computer link to the media item.

According to a fifth aspect of the invention, there is provided a system for efficient delivery of computer media over a network of computers operated by a plurality of computer users, including:

(a) a plurality of computer media items located on computers on the network;

(b) an annotation record for each media item on a computer, each annotation record including at least some of the following classes of information:
 (i) an identification of the computer on which the media item was created or introduced to the network
 (ii) identifications of one or more computers on which a copy of the media item is presently located
 (iii) an identification list of computers which have established a computer link to the media item
 (iv) an identification list of computer users who have a personal software agent which has established a computer link to the media item
 (v) an indication enabling version control of the media item
 (vi) one or more indications as to the subject matter of the media item;

(c) a media software agent associated with each computer which has media items on it;

(d) a personal software agent associated with each computer user; and (e) one or more preferences records associated with each personal software agent, each preferences record including indications as to preferred subject matter of media items for a computer user, based on one or more of the following:
 (i) preferences expressly indicated by the computer user
 (ii) preferences ascertained from the subject matter of media items to which the computer user has previously established computer links
 (iii) preferences ascertained from the subject matter of media searches conducted by the computer user;

wherein a computer user's personal software agent co-operates with the media software agents to provide the computer user with access to a new or modified media item whenever that media item relates to a subject matter which is included in the computer user's preferences record and whenever the annotation record corresponding to the media item indicates that the computer user has a computer link to the media item.

The invention will now be described in greater detail by reference to the attached drawings. It is to be understood that the particularity of the drawings does not supersede the generality of the preceding description of the invention.

FIG. 1 is a schematic illustration of a system according to an embodiment of the invention.

FIG. 8 is a flow chart showing the steps involved in distributing new and updated media items according to an embodiment of the invention.

Referring firstly to FIG. 1, there is shown a system for efficient delivery of computer media over a network of computers. In this case, the computers are labelled "User A's PC", "User B's PC", "Corporate PA Server" and "Global PA Server". A plurality of computer media items are located on computers on the network; in this case a single representative media item 1 is illustrated on User A's PC. The PA (personal assistant) server is a server program for the PA system. There can be several PA servers on the network, hosted by different organizations or providers. Examples of providers may be schools, companies or Internet service providers. User A's PC is connected to its personal assistant (PA) 2 on Corporate PA Server through its client PA 3. The client PA 3 provides the user-side functionality of the PA system. It has a graphical user interface and connects to a PA server. User B, through PA client 8, may be connected to his PA 4 residing on the same corporate PA server, another PA server, or the Global PA server as shown in FIG. 1. Also residing on the Corporate PA Server is another software agent, referred to as a "group agent" (GA) 5. A group is a list of users that are arbitrarily distributed around the network. GA 5 manages the group's shared media. GA 5 maintains an annotation record for each media item that is shared by members of the group. These media items may reside on the individual user's PC or on the corporate PA server. Each annotation record includes at least some of the following classes of information:

(i) an identification of the computer on which the media item was created or introduced to the network (ii) identifications of one or more computers on which a copy of the media item is presently located (iii) an identification list of computers which have established a computer link to the media item (iv) an identification list of computer users whose personal software assistants have established a computer link to the media item (v) an indication enabling version control of the media item (vi) one or more indications as to the subject matter of the media item.

In the case illustrated, GA 5 maintains an identification list of computers which have established a computer link 6 (described as a "media shortcut") to the shared media item 1 on User A's PC. User B has also established a media shortcut 7 to media item 1 on User A's PC, either as a result of having been "sent" the shortcut by User A (such as by means of an e-mail message informing User B of the existence of the media item) or as a result of having conducted a search for relevant information, which located the media item in question. Whenever the media item is updated or deleted, the software agent associated with the corresponding annotation record (i.e. the GA) updates the annotation record and forwards a notification record to each computer or the PA of each computer user on the network which has a computer link to the media item (i.e. to itself and User B's PC).

Figure 3:
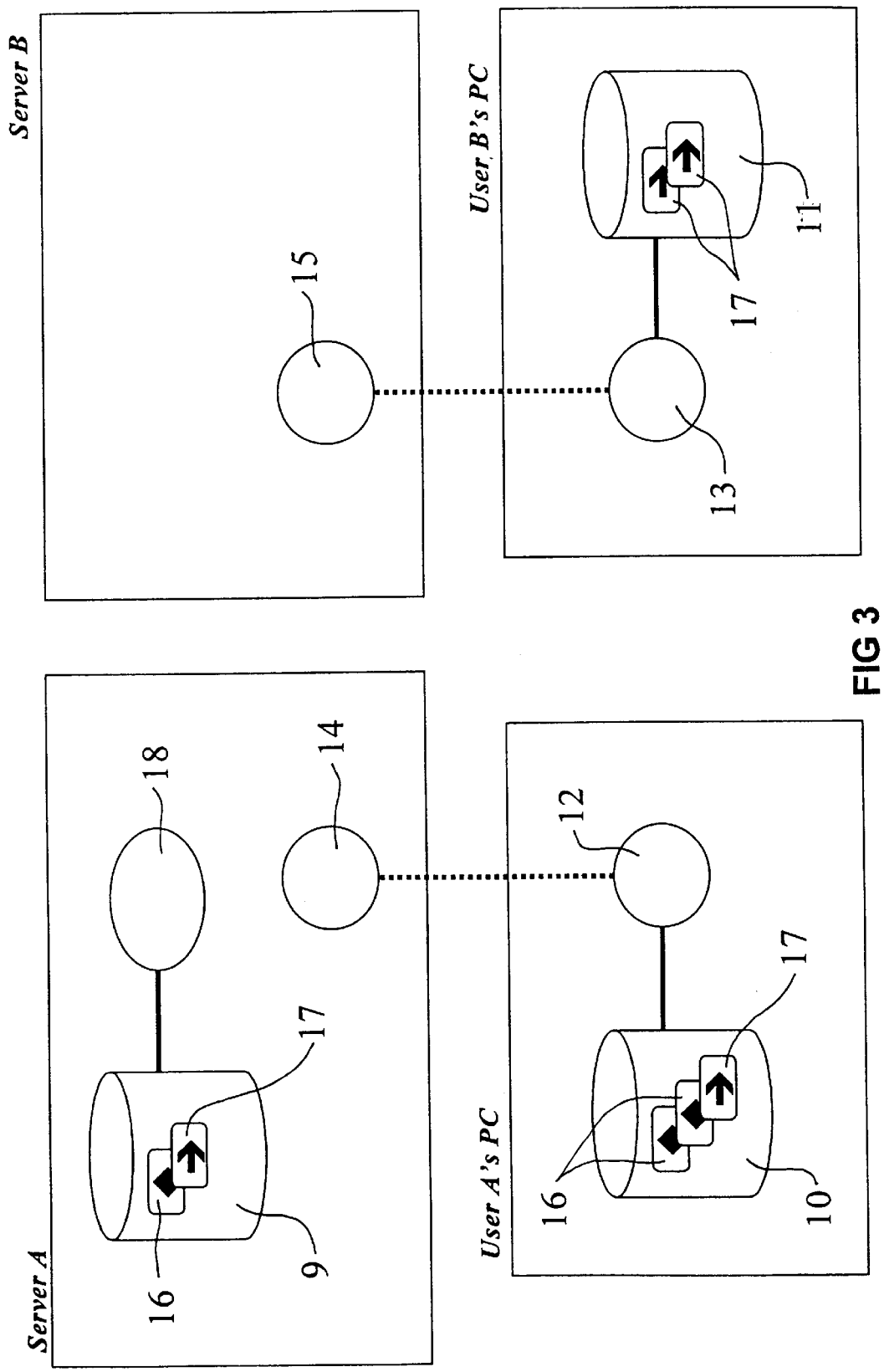
FIG. 3 is a schematic illustration of part of another embodiment of the invention.

Aspects of this are illustrated in more detail in FIG. 3, which shows a group media base 9 on Server A, a media base 10 on User A's PC logged onto Server A, and a media base 11 on User B's PC logged onto Server B. A PA client 12, 13 operates on each User PC, with each user's PA 14, 15 operating on the respective server. Each media base is composed of items indicated by diamonds 16, which correspond to original media items or full copies of media items, and items indicated by arrows 17, which correspond to media shortcuts. A GA 18 operates in association with group media base 9 located on Server A.

Figure 2:
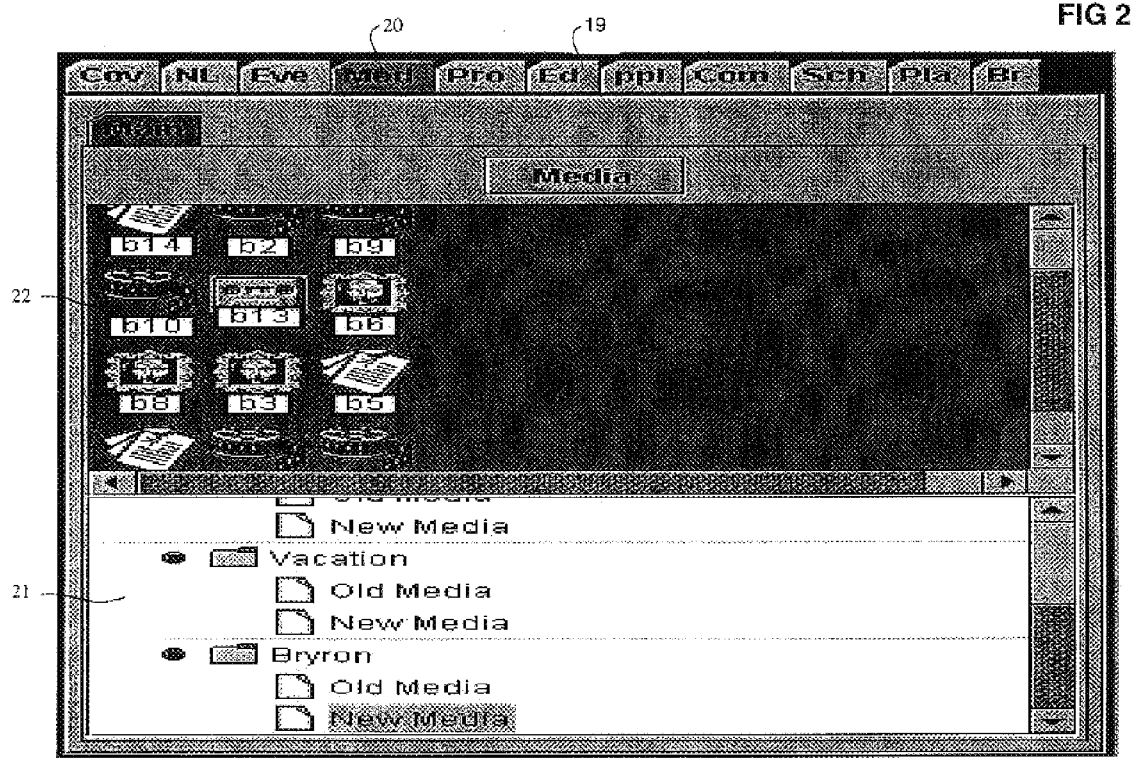
FIG. 2 is a sample screen capture showing the appearance of a screen in software operating according to an embodiment of the invention.

FIG. 2 illustrates a screen capture from a software program developed to implement the present invention. The screen shows a group of note-tabs 19, with the "media" tab 20 selected. A media base structure 21 is shown in the bottom part of the screen, and the media items and shortcuts 22 located in the presently selected view are displayed on the top part of the screen. This provides a way of viewing the media items and shortcuts to media items presently located in the user's media base. Different views may be obtained based on specified characteristics in the annotations associated with media items. Any item or shortcut in the media base may be viewed, for example, by double-clicking on the item. This invokes the appropriate default viewer for the media type. The media type can be determined from the annotations, which preferably include a field for media type.

A media item can be added to the media base by transferring it from the file system of an operating system. As the selected media item is added to the media base a dialog box appears asking the user to enter annotations for the first media item. The dialog also contains a button that allows the user to view the media item so that it can be inspected during annotation. Once the annotation is complete, the user can confirm, thus completing the transfer into the media base. When media items are transferred from one media base into another, annotations can be copied across without transferring actual content data. The resulting entry, called a media shortcut, contains a reference to the original remote media item. The media shortcut is a fully fledged entry in the media base, and participates in views exactly like the local media items. Its display may have a visual clue identifying it as a shortcut.

When the media item is viewed, however, it is usually loaded from the remote media base. The PA implements a cache so that the document content does not have to be loaded every time it is needed. If the item content is already present in the cache, but has not been used in the current log-in session, the remote media base will be asked for the latest modification time stamp of the original media. If the media in the cache is found to be up to date, it is used directly; if it is not (or if the media item is not cached) the content is transferred from the remote media base and stored in the cache.

Figure 4:
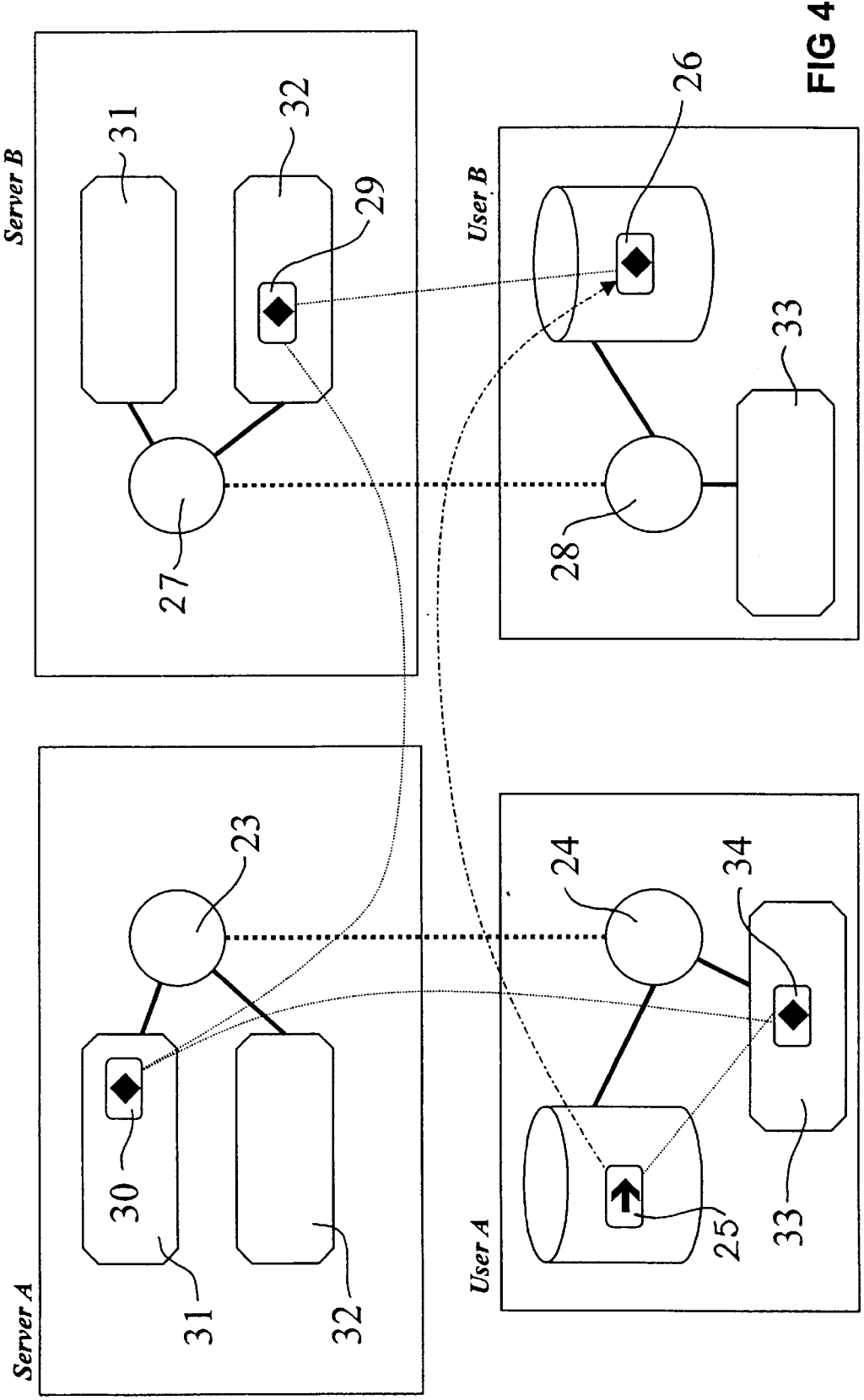
FIG. 4 is a schematic illustration of a part of an embodiment of the invention.

FIG. 4 illustrates how a media item is retrieved using a media shortcut. In this case, the original media item is located on the User B's PC. User A who is logged onto his PA 23 on Server A through PA client 24 has acquired a media shortcut 25 pointing to the media item 26, which is located on User B's PC. User B is logged onto his PA 27 on Server B via Client PA 28. When User A activates shortcut 25 to obtain a copy of media item 26, the copy is sent via Server B and then Server A. Both servers make a cached copy 29, 30 of the media item as it passes through, so that the retrieval process is accelerated if another user requests a copy of the same media item. The caching process is optional, and cached copies may be deleted at any appropriate time, such as when space is required or if a predetermined amount of time passes without receiving any further requests for the media item. In the embodiment shown, Server A and Server B both have receiving caches 31 and publishing caches 32. User A and User B both have viewing caches 33. A cached copy 34 of the media item is viewed by User A in viewing cache 33.

Figure 5:
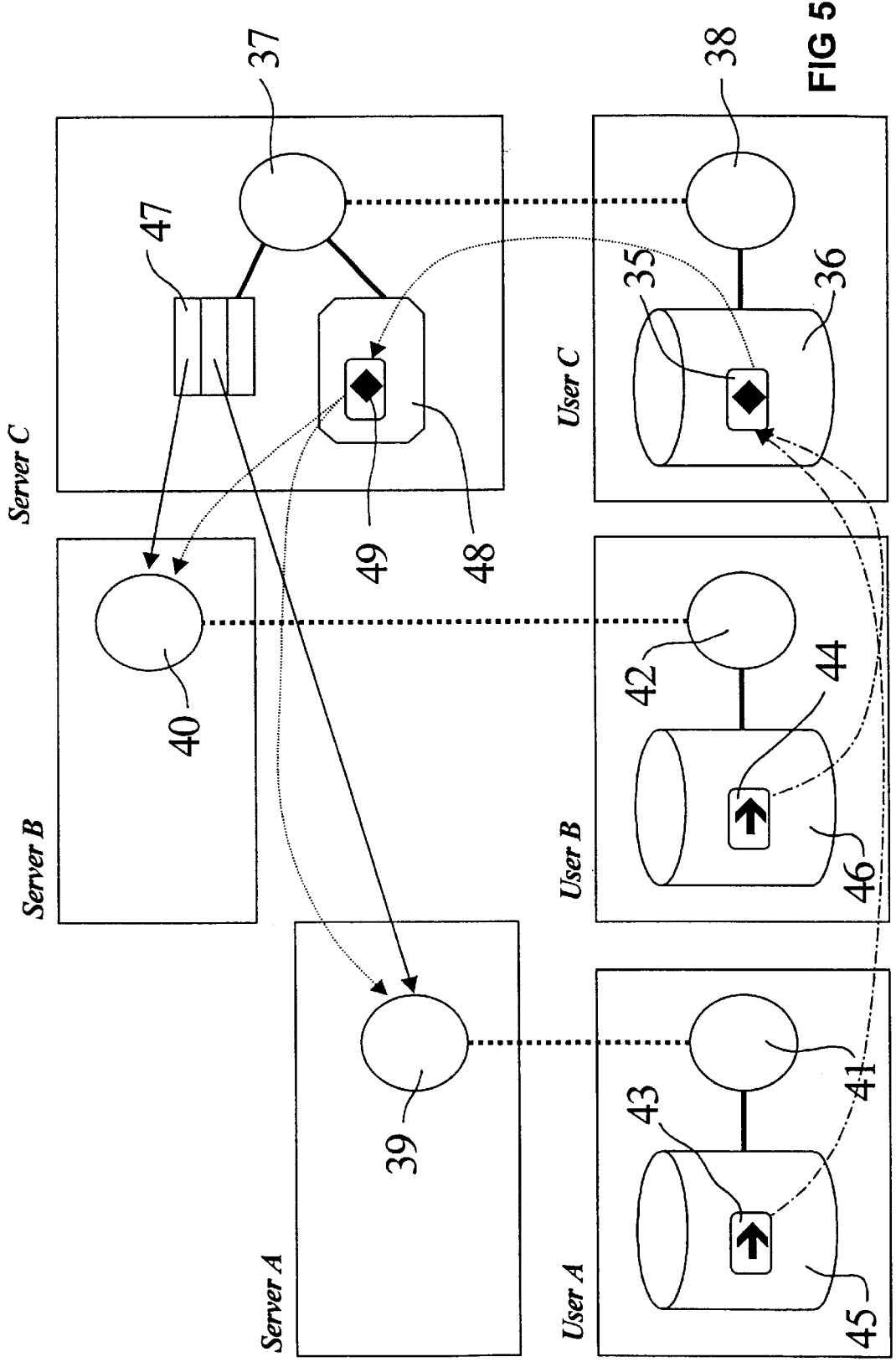
FIG. 5 is a schematic illustration of a part of an embodiment of the invention.

FIG. 5 illustrates the steps involved in updating a media item. The original media item 35 resides in media base 36 on User C's PC. User C's PA 37 resides on Server C and a PA client 38 resides on User C's PC. Users A and B who are logged onto their PAs 39, 40 on Server A and Server B respectively through their respective PA clients 41, 42 both have media shortcuts 43, 44 to the media item 35 in their respective media bases 45, 46. User C's PA maintains the annotation record 47 for media item 35, which includes a list of all computer users who have a media shortcut pointing to the media item. When the original media item 35 is updated, PA client 38 operating on the same PC identifies the change, notifies PA 37 on Server C, and copies the updated media item into a publishing cache 48 on Server C. Notification records are then sent to the PAs 39, 40 associated with all computers which have media shortcuts pointing to the media item, and the users associated with those computers may download the updated media item automatically, at an off-peak time, not at all, or at leisure, depending on preferences which may be predefined and programmed into the appropriate PA.

Figure 6:
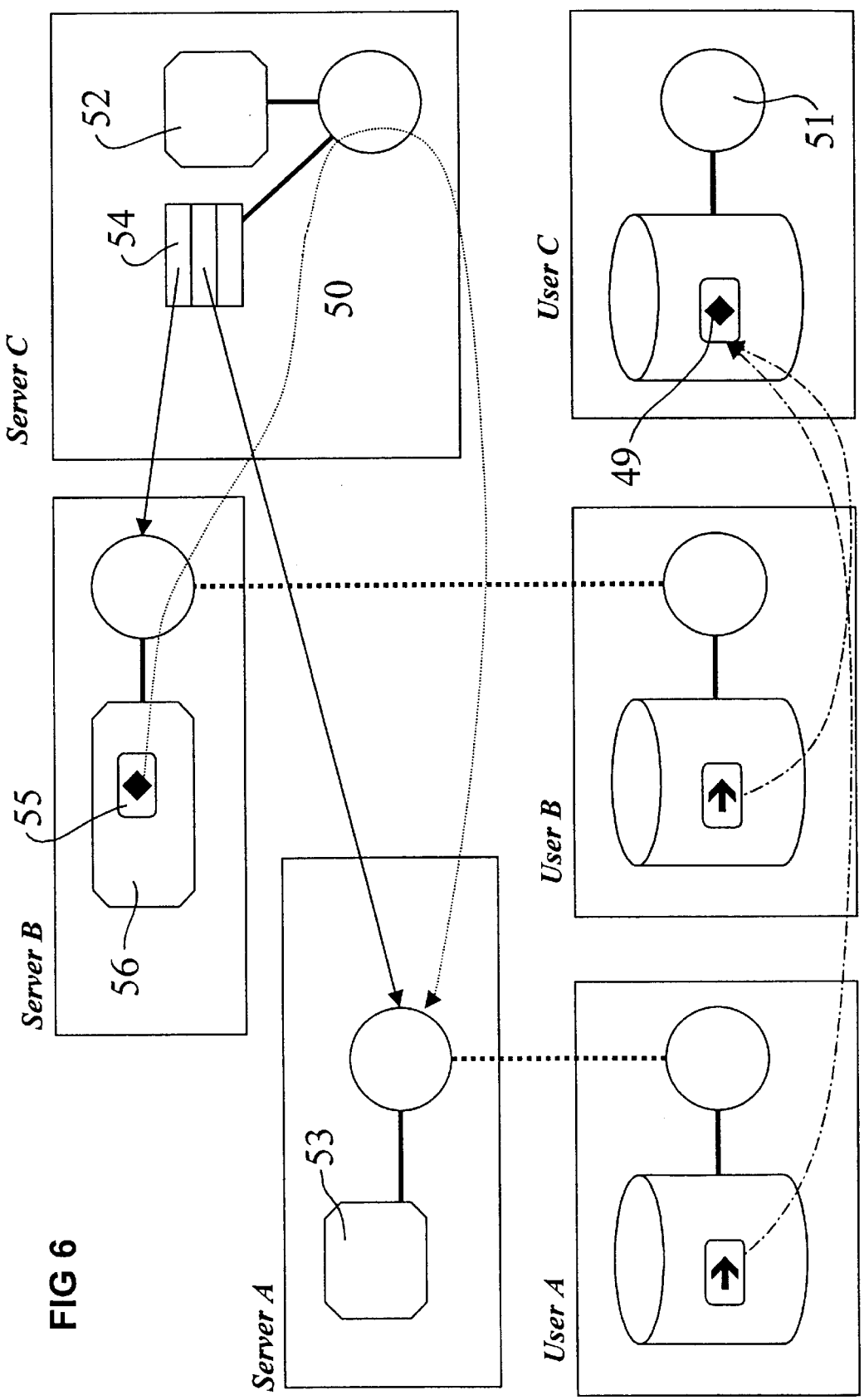
FIG. 6 is a schematic illustration of a part of an embodiment of the invention.

FIG. 6 illustrates the concept of "shadowing". This can enable a person to obtain a copy of a media item even when then computer which has the original item is offline. In the case illustrated, the original media item 49 is located on User C's PC. User C's PA 50 resides on Server C and User C's PA client 51 resides on User C's PC. User C is offline, so a request for a copy of media item 49 made by User A cannot be satisfied by a direct link to the original item 49. There is no cached copy of the media item on Server A or on Server C (publishing caches 52, 53 are empty). However, PA 50 on Server C associated with the owner of original media item 49 maintains as part of its annotation record 54 a list of locations of copies of the media item. Using this list, it is possible to find that a cached copy 55 of the media item resides in a receiving cache 56 on Server B, so the request can be satisfied even though the owner of the original is offline.

Figure 7:
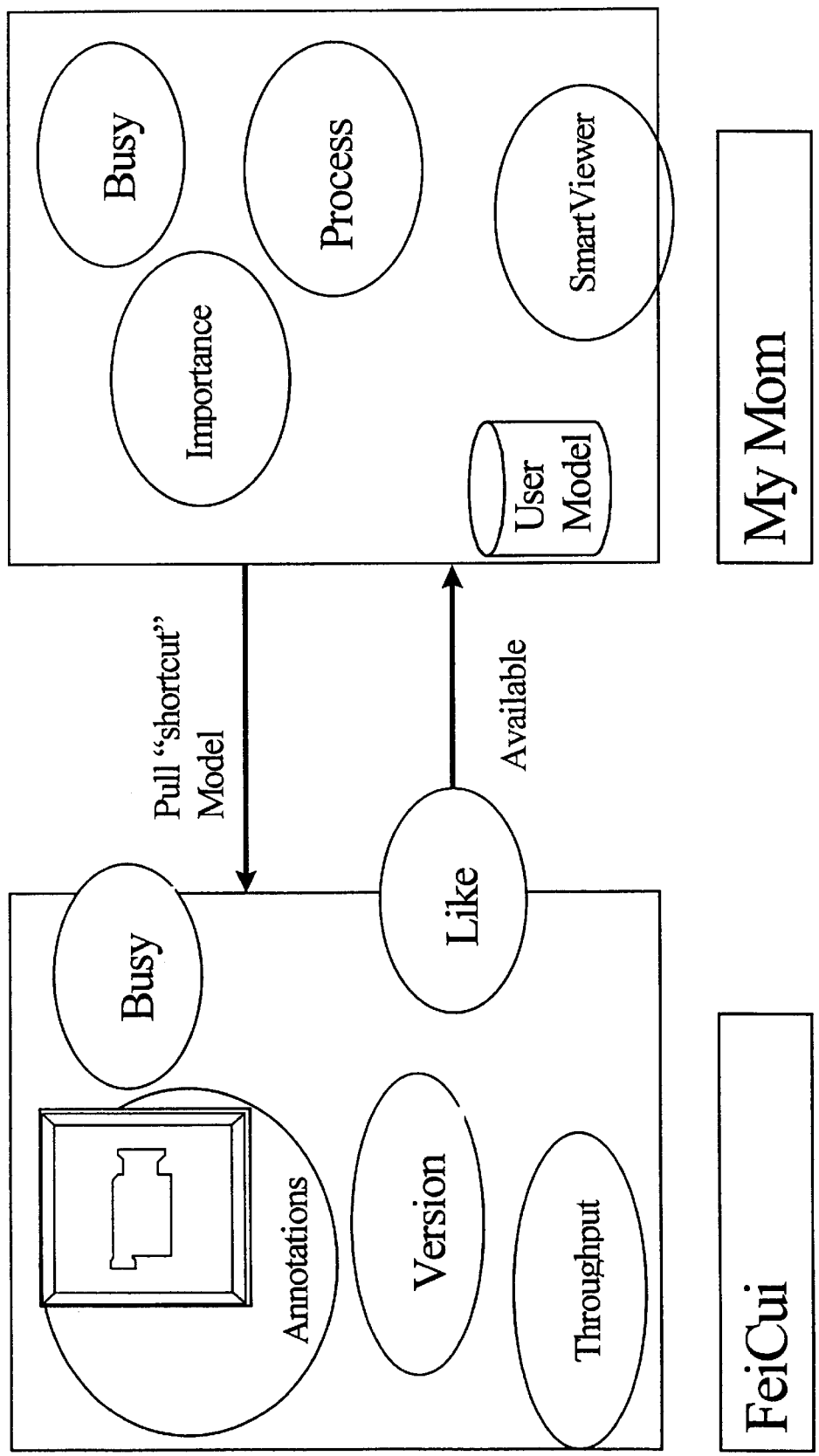
FIG. 7 is a schematic illustration of a part of an embodiment of the invention.

FIG. 7 illustrates the process of delivery of "SmartMedia", which is a media item which has an associated annotation record. The SmartMedia item is created by the user labelled "FeiCui". Typically a user need only change explicitly a few keywords from time to time when creating a collection of SmartMedia (e.g. adding the keyword "baby" to a baby photo or adding the key words "project plan", "milestones", "personal assistant" to a project plan on developing personal assistants). The other annotations such as media type, confidentiality, current project task, creation date and a watermark are created automatically by the PA. If FeiCui had previously sent a baby picture to his mom "My Mom", his mother may have instructed her PA, "I like this picture." Her PA would have then requested that any media like the last would automatically be sent to her. In this case, the new SmartMedia would determine that it is similar to the media that Mom liked, and would send a message to Mom's PA that includes the annotations relating to the media item. Mom's PA, knowing Mom's schedule, connection times and system configurations (i.e. dial-up connection at home, LAN at work) would determine the best time to "pull" the new baby image.

Annotations enable the tracking of media or document versions, and the tagging of documents with attribute name and attribute value pairs. Automatic tracking of documents allows the automatic notification to users in a group of new versions of a document or of the availability of new documents or other media items of a type or subject matter in which the user has previously expressed interest. This can be done by the user specifying to his PA the attributes of media items which are of interest to him or her. When new or updated media items are made available by a user or to a user in the group, these are checked with the user's indicated preferences using standard statistical methods. If there is a match, the media items are notified to the user.

A flow chart illustrating this process is given in FIG. 8. A new media item is created by or made available to User A's PA. User A's PA then does a version check to find out whether this is a current or superseded version of a currently available media item, and a "like check" to find out which other users have indicated that they would like to receive media items of this type. Having determined that User B has expressed a desire for media items of this type, User A's PA sends a message to User B's PA indicating that the new media item is available. User B's PA then determines whether the media item is important and determines whether the network is currently busy. If the network is not busy, a copy of the media item is retrieved immediately; otherwise the media item is obtained at a later stage or a shortcut is made available in User B's PA. How the media item is retrieved or can be accessed depends on the preferences set by User B in his PA.

It is to be understood that various modifications, additions and/or alterations may be made to the parts previously described without departing from the ambit of the invention.

What is claimed is:

1. A method of optimizing delivery of computer media over a network of computers, including the steps of:
    (a) creating an annotation record for each item of computer media;
    (b) including within the annotation record one or more of the following classes of information:
        (i) an identification of the computer on which the media item was created or introduced to the network
        (ii) identifications of one or more computers on which a copy of the media item is presently located
        (iii) an identification list of computers which have established a computer link to the media item
        (iv) an identification list of computer users who have personal software assistants which have established a computer link to the media item
        (v) an indication enabling version control of the media item
        (vi) one or more indications as to the subject matter of the media item; and
    (c) whenever a media item is updated or deleted, updating the corresponding annotation record and forwarding a notification record to each computer or a personal software assistant of each computer user on the network which has a computer link to the media item.

2. A method according to claim 1 including the further steps of:
    (a) creating one or more preferences records for one or more computers or computer users on the network;
    (b) including within the preferences records indications as to preferred subject matter of media items, based on one or more of the following:
        (i) preferences expressly indicated by the computer user
        (ii) preferences ascertained from the subject matter of media items to which the computer or computer user has previously established computer links
        (iii) preferences ascertained from the subject matter of media searches conducted on the computer or by the computer user; and
    (c) providing each computer or computer user with access to a new or modified media item whenever that media item relates to a subject matter which is included in the computer's or computer user's preferences record.

3. A method according to claim 2 wherein the step of providing access to a new or modified media item is done by means of a search for new or modified media of relevant subject matter which is conducted whenever the computer or computer user comes on-line or in some other periodical manner, followed by establishing a computer link to the media items located in the search.

4. A method according to claim 2 wherein the step of providing access to a new or modified media item is done whenever a media item is created or modified, by means of a search for preferences records which indicate a preference for subject matter corresponding to the subject matter of the new or modified media item, followed by the step of forwarding a notification record to the computer or computer user associated with each preferences record located in the search.

5. A method according to claim 1 wherein the network of computers includes one or more intermediate computers located in the network between other computers such that at least some of the media items travel from an originating computer through an intermediate computer to a requesting computer, wherein one or more media items are cached in one or more of the intermediate computers, and a request from a requesting computer for a media item is satisfied from a cached copy on an intermediate computer in preference to establishing a communications path all the way to the originating computer, thereby reducing the total amount of traffic necessary on the network, particularly when the media item is requested frequently.

6. A method according to claim 5 wherein, when a particular request for a media item cannot be satisfied by a particular computer as a result of the computer being off-line or the media item having been deleted from that computer, the request is passed to another computer in the network having a copy of the media item.

7. A method according to claim 1 wherein new or updated media items are downloaded to one or more computers which have links to those media items:
    (a) during off-peak times for traffic on the network;
    (b) when specifically requested by those computers; or
    (c) at times previously designated by those computers.

8. A method of selectively providing computer media to a computer user on a computer connected to a network, including the steps of:
    (a) creating a preferences record for the computer user;
    (b) including within the preferences records indications as to preferred subject matter of media items, based on one or more of the following:
        (i) preferences expressly indicated by the computer user
        (ii) preferences ascertained from the subject matter of media items to which the computer user has Previously established computer links
        (iii) preferences ascertained from the subject matter of media searches conducted by the computer user;
    (c) providing the computer user with access to a new or modified media item whenever that media item is created or modified; and is related to a subject matter which is included in the computer user's preferences record by means of a search for preferences records which indicate a preference for subject matter corresponding to the subject matter of the new or modified media item; and (d) forwarding a notification record to the computer or computer user associated with each preferences record located in the search.

9. A method of selectively providing computer media to a computer user on a computer connected to a network, including the steps of:

(a) creating a preferences record for the computer user;

(b) including within the preferences records indications as to preferred subject matter of media items, based on one or more of the following:
  (i) preferences expressly indicated by the computer user
  (ii) preferences ascertained from the subject matter of media items to which the computer user has previously established computer links
  (iii) preferences ascertained from the subject matter of media searches conducted by the computer user; and (c) providing the computer user with access to a new or modified media item whenever that media item relates to a subject matter which is included in the computer user's preferences record by means of a search for new or modified media of relevant subject matter which is conducted whenever the computer or computer user comes on-line or in some other periodical manner; and (d) establishing a computer link to the media items located in the search.

10. A system for efficient delivery of computer media over a network of computers, including:

(a) a plurality of software agents, wherein at least one software agent is associated with a user's computer on the network;

(b) one or more preferences records associated with each software agent, each preferences record including indications as to preferred subject matter of media items for a computer user, based on one or more of the following:
  (i) preferences expressly indicated by the computer user
  (ii) preferences ascertained from the subject matter of media items to which the computer user has previously established computer links
  (iii) preferences ascertained from the subject matter of media searches conducted by the computer user;

(c) a plurality of computer media items located on computers on the network, each media item have associated with it one or more indications of subject matter;

wherein a software agent provides a computer user with access to a new or modified media item whenever that media item relates to a subject matter which is included in the computer user's preferences record.

11. A system for efficient delivery of computer media over a network of computers, including:

(a) a plurality of computer media items located on computers on the network;

(b) an annotation record for each media item on a computer, each annotation record including one or more of the following classes of information:
  (i) an identification of the computer on which the media item was created or introduced to the network
  (ii) identifications of one or more computers on which a copy of the media item is presently located
  (iii) an identification list of computers which have established a computer link to the media item
  (iv) an identification list of computer users who have personal software assistants which have established a computer link to the media item
  (v) an indication enabling version control of the media item
  (vi) one or more indications as to the subject matter of the media item; and (c) a software agent associated with each computer which has annotation records;

wherein, whenever a media item is updated or deleted, the software agent associated with the corresponding annotation record updates the annotation record and forwards a notification record to each computer or a personal software assistant of each computer user on the network which has a computer link to the media item.

12. A system for efficient delivery of computer media over a network of computers operated by a plurality of computer users, including:

(a) a plurality of computer media items located on computers on the network;

(b) an annotation record for each media item on a computer, each annotation record including one or more of the following classes of information:
  (i) an identification of the computer on which the media item was created or introduced to the network
  (ii) identifications of one or more computers on which a copy of the media item is presently located
  (iii) an identification list of computers which have established a computer link to the media item
  (iv) an identification list of computer users who have personal software agents which have established a computer link to the media item
  (v) an indication enabling version control of the media item
  (vi) one or more indications as to the subject matter of the media item;

(c) a media software agent associated with each computer which has media items on it;

(d) a personal software agent associated with each computer user; and (e) one or more preferences records associated with each personal software agent, each preferences record including indications as to preferred subject matter of media items for a computer user, based on one or more of the following:
  (i) preferences expressly indicated by the computer user
  (ii) preferences ascertained from the subject matter of media items to which the computer user has previously established computer links
  (iii) preferences ascertained from the subject matter of media searches conducted by the computer user;

wherein a computer user's personal software agent co-operates with the media software agents to provide the computer user with access to a new or modified media item whenever that media item relates to a subject matter which is included in the computer user's preferences record and whenever the annotation record corresponding to the media item indicates that the computer user has a computer link to the media item.

13. The system of claim 10, wherein at least one software agent is associated with a server on the network.

* * * * *